(12) United States Patent
Park

(10) Patent No.: US 7,905,531 B2
(45) Date of Patent: Mar. 15, 2011

(54) APPARATUS FOR MOUNTING ROOF RACK TO SUNROOF FOR VEHICLES

(75) Inventor: Jae Han Park, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 12/479,224

(22) Filed: Jun. 5, 2009

(65) Prior Publication Data
US 2010/0109364 A1    May 6, 2010

(30) Foreign Application Priority Data
Nov. 4, 2008    (KR) .......................... 10-2008-0108921

(51) Int. Cl.
*B60P 3/00*    (2006.01)
(52) U.S. Cl. ......................... 296/3; 296/216.01; 224/309

(58) Field of Classification Search ............. 296/3, 37.7, 296/216.01, 220.01; 224/309
See application file for complete search history.

(56) References Cited

U.S. PATENT DOCUMENTS
6,561,397 B1 * 5/2003 Bauer et al. .................. 224/316
2002/0158491 A1 * 10/2002 Patelczyk et al. ........ 296/220.01
* cited by examiner

*Primary Examiner* — Lori L Lyjak
(74) *Attorney, Agent, or Firm* — Morgan, Lewis & Bockius LLP

(57) ABSTRACT

An apparatus for mounting a roof rack to a sunroof for a vehicle may include an outer sunroof frame covering at a first end thereof a sunroof actuating unit and being coupled at a second end thereof to a side outer panel, and/or a mounting member formed at the second end of the outer sunroof frame and coupled to the roof rack.

15 Claims, 3 Drawing Sheets

APPARATUS FOR MOUNTING ROOF RACK TO SUNROOF FOR VEHICLES

CROSS-REFERENCE TO RELATED APPLICATIONS

The present application claims priority to Korean Patent Application Number 10-2008-0108921 filed Nov. 4, 2008, the entire contents of which application is incorporated herein for all purpose by this reference.

BACKGROUND OF THE INVENTION

1. Field of the Invention

The present invention relates to an apparatus for mounting a roof rack to both sides of a sunroof of a vehicle.

2. Description of Related Art

Recently, vehicles are provided with various kinds of devices for convenience. A sunroof is a representative example of the devices for convenience. With respect to the sunroof, a window is formed in a roof panel of a coupe or sedan but not a convertible vehicle and is constructed such that it can be opened or closed in a sliding manner. In the case of the vehicle having the sunroof, a user, such as a driver or passenger, opens the sunroof on a clear day to take fresh outside air, that is, the user can feel access to an open space through the sunroof. Such sunroofs are classified into the case where only a portion of a roof panel is open and the opening is openably closed, and the case where almost an entire area of a roof panel is made of glass and a front part thereof is opened or closed in a sliding manner. Particularly, the latter case is called a 'panoramic sunroof'.

Meanwhile, a roof rack is another representative example of the devices for convenience. The roof rack is a bar-shaped support device which is provided on both sides of a roof panel of a vehicle. Due to a spatial limitation of a trunk and a passenger compartment of the vehicle, there is a limitation in the amount of loads that can be loaded in the vehicle. However, in the case where the vehicle is provided with a roof rack, loads can be loaded on the roof of the vehicle using the roof rack. Here, preferably, the loads are supported by crossbars connected between sidebars of the roof rack. The crossbars are aligned in the transverse direction of the roof panel of the vehicle and can be varied in position by sliding them along the sidebars of the roof rack.

FIG. 1 is a perspective view showing a panoramic sunroof and a roof rack which are mounted to a vehicle. As shown in the drawing, almost an entire area of a roof panel of the vehicle having the panoramic sunroof 10 is made of glass. The sunroof glass includes a front sunroof glass 12 and a rear sunroof glass 14. The front sunroof glass 12 is opened or closed by sliding on the upper surface of the rear sunroof glass 14. The roof rack 30 is provided on the both sides of the sunroof glass. Here, in the case where the vehicle has both the sunroof 10 and the roof rack 30, portions to which the two devices are mounted are partially overlapped, so that there is a limitation in design of internal structures and external appearances of the two devices.

FIG. 2 is a sectional view showing a conventional roof rack mounting apparatus for the vehicle having the sunroof. The roof rack 30 is mounted to a side outer panel 50 using a bracket 52 having a bolt 54. A roof side molding 60 is provided between the roof rack 30 and the side outer panel 50. An outer sunroof frame 20 of the panoramic sunroof supports on a first end thereof the rear sunroof glass 14, and a second end thereof is coupled to the side outer panel 50. The second end of the outer sunroof frame 20 is coupled to the side outer panel 50 through a subsidiary frame 72. A waterproof sealer 74 is interposed between the subsidiary frame 72 and the outer sunroof frame 20. The subsidiary frame 72 is welded to the side outer panel 50.

However, in the conventional roof rack mounting apparatus for the vehicle having the sunroof and the roof rack, the subsidiary frame 72 is used for installation of the outer sunroof frame 20 and the roof rack bracket 52. Therefore, because of the use of the subsidiary frame 72, work effort and the cost of manufacturing the apparatus are increased. Furthermore, because the subsidiary frame 72 is fastened to the side outer panel 50 by welding, there is a problem in that rainwater may enter the passenger compartment between the subsidiary frame 72 and the side outer panel 50.

In addition, the separate bracket 52 is required to fasten the roof rack 30 to the side outer panel 50, with the result that work effort and cost of manufacturing the apparatus are increased.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an apparatus for mounting a roof rack to a sunroof for vehicles which is constructed such that an outer sunroof frame is directly coupled to a side outer panel without the use of a separate subsidiary frame, and the roof rack is directly mounted to the outer sunroof frame, thus reducing the number of components, thereby reducing the production cost.

In an aspect of the present invention, the apparatus for mounting a roof rack to a sunroof for a vehicle may include an outer sunroof frame covering at a first end thereof a sunroof actuating unit and being coupled at a second end thereof to a side outer panel, and a mounting member formed at the second end of the outer sunroof frame and coupled to the roof rack.

The outer sunroof frame and the side outer panel may be coupled to the roof rack under the roof rack in a vertical direction thereof.

The mounting member may be configured to protrude upwards from the second end of the outer sunroof frame and the roof rack has in a lower surface thereof an insert space, into which a portion of the mounting member is inserted, with a fastening member provided in the insert space and being coupled to the mounting member, wherein the mounting member of the outer sunroof frame includes a stud bolt, and the fastening member of the roof rack includes a nut tightened over the stud bolt in the insert space of the roof rack and wherein a support protrusion is provided on the second end of the outer sunroof frame, the support protrusion supporting the stud bolt thereon, and a plurality of support ribs is provided on the second end of the outer sunroof frame, the support ribs extending predetermined lengths to come in contact with the support protrusion to support the support protrusion.

In an aspect of the present invention, a sealer may be provided between the second end of the outer sunroof frame and the side outer panel to prevent rainwater from being drawn into a passenger compartment of the vehicle, wherein the sealer is disposed under the roof rack in a vertical direction thereof and wherein a medial portion of the outer sunroof frame is bent downwards to have a concave shape, and a sunroof rail is installed therein, the medial portion of the outer sunroof frame being disposed lower than the sealer.

In another aspect of the present invention, a roof side molding may be provided between the second end of the outer sunroof frame and the roof rack in an upward direction, the roof side molding being in contact with an edge of a sunroof glass in a horizontal direction and the roof side molding being coupled to the roof rack by the mounting member, wherein a medial portion of the outer sunroof frame is bent downwards to have a concave shape, and a sunroof rail is installed therein and wherein the edge of the sunroof glass is disposed over the medial portion of the outer sunroof frame.

In further another aspect of the present invention, a flange may be provided on an end of the side outer panel adjacent to the sunroof, and the second end of the outer sunroof frame makes close contact with an upper surface of the flange through a sealer which is interposed therebetween, wherein the sealer is disposed under the roof rack in a vertical direction thereof and wherein a medial portion of the outer sunroof frame is bent downwards to have a concave shape, and a sunroof rail is installed therein, the medial portion of the outer sunroof frame being disposed lower than the sealer.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
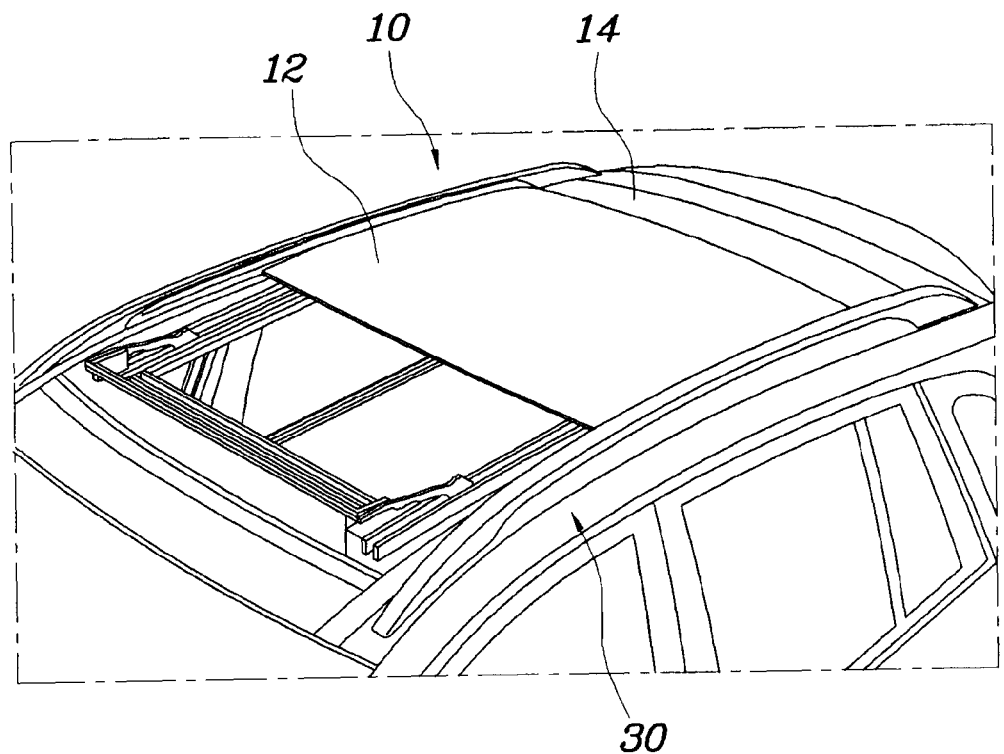
FIG. 1 is a perspective view showing a vehicle having a sunroom and a conventional roof rack.
Figure 2:
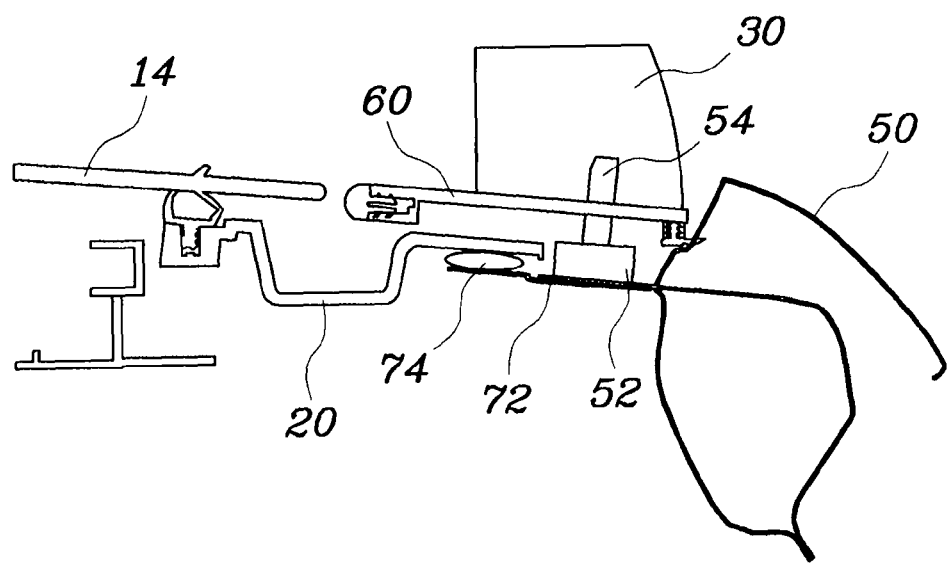
FIG. 2 is a sectional view showing a conventional roof rack mounting apparatus for the vehicle having the sunroof.
Figure 3:
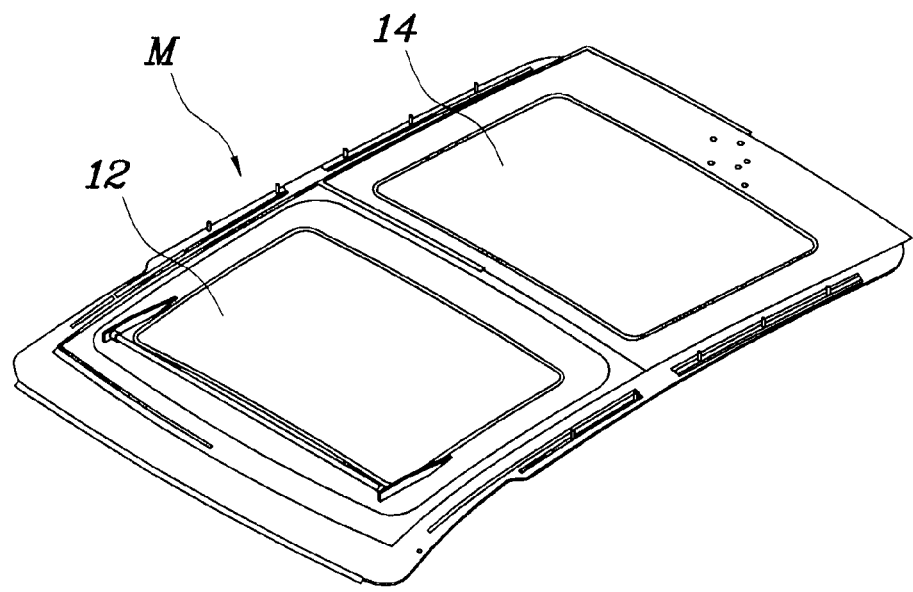
FIG. 3 is a perspective view of an exemplary apparatus for mounting a roof rack to a sunroof for vehicles, according to the present invention.

FIG. 3 is a perspective view showing a panoramic sunroof and the roof rack mounting apparatus provided on both sides of the sunroof. As stated above, there are various kinds of sunroofs. Of such sunroofs, the case of the panoramic sunroof will be described with reference to various exemplary embodiments.

The panoramic sunroof has a sunroof glass which is divided into a front sunroof glass 12 and a rear sunroof glass 14. Preferably, for roof racks attached to the panoramic sunroof, five roof rack mounting apparatuses M are provided on each of the both sides of the sunroof glass. Furthermore, as shown in the drawing, the roof rack mounting apparatuses M may have components, such as an outer sunroof frame and a side outer panel, jointly, and may be configured such that stud bolts are spaced apart from each other at regular intervals. The roof rack (not shown in FIG. 3) is coupled to the upper ends of the stud bolts.

Figure 4:
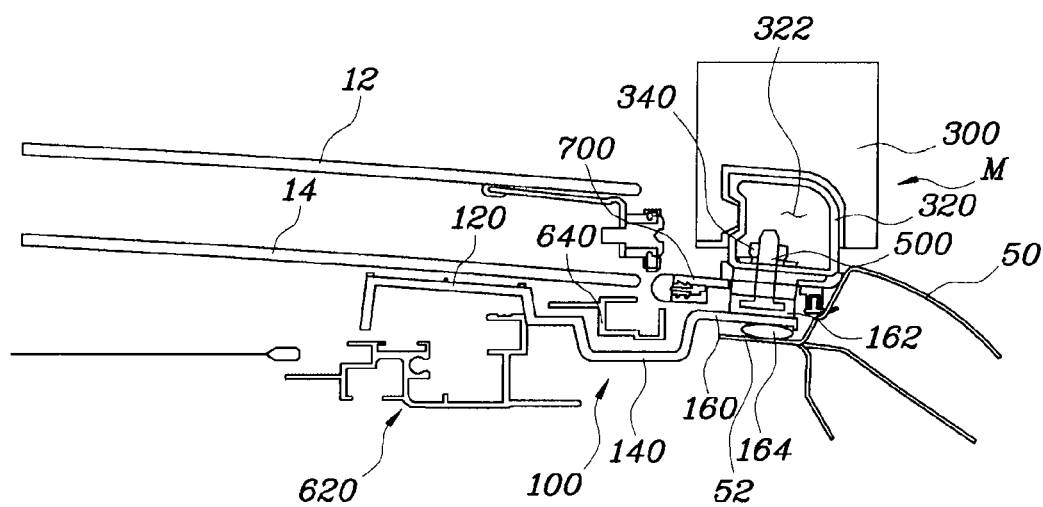
FIG. 4 is a sectional view of the roof rack mounting apparatus of FIG. 3.

FIG. 4 is a sectional view showing the roof rack mounting apparatus of FIG. 3, taken along a stud bolt. The roof rack mounting apparatus of various embodiments of the present invention includes an outer sunroof frame 100, a mounting member 500, a roof rack 300 and a sealer 164. The outer sunroof frame 100 has a first end 120 which covers a sunroof actuating unit 620, and a second end 160 which is coupled to a side outer panel 50. The mounting member 500 protrudes upwards from the second end 160 of the outer sunroof frame 100. The roof rack 300 has in the lower surface thereof an insert space 322, into which the mounting member 500 is inserted. A fastening member 340 which is coupled to the mounting member 500 is provided in the insert space 322. The sealer 164 is interposed between the second end 160 of the outer sunroof frame 100 and the side outer panel 50 to prevent foreign material, such as rainwater, from being drawn into the passenger compartment of the vehicle.

The panoramic sunroof includes the front and rear sunroof glasses 12 and 14, the sunroof actuating unit 620, the outer sunroof frame 100 and a sunroof rail 640. FIG. 4 illustrates a state of the front sunroof glass 12 which slides on the rear sunroof glass 14. The sunroof actuating unit 620 which is provided below the rear sunroof glass 14 actuates the front sunroof glass 12 forwards or backwards. The sunroof actuating unit 620 is covered with the outer sunroof frame 100. The outer sunroof frame 100 can have various shapes, and it functions to cover the sunroof actuating unit 620 and provide a seat for installation of the sunroof rail 640.

Furthermore, the outer sunroof frame 100 is configured such that a medial portion 140 thereof is bent downwards to have a concave shape, while the first end 120 thereof covers the sunroof actuating unit 620 and the second end 160 thereof is directly coupled to the side outer panel 50. The sunroof rail 640 is installed in the medial portion 140 which is bent downwards.

A flange 52 is provided on an end of the side outer panel 50 which is adjacent to the sunroof. The second end 160 of the outer sunroof frame 100 can be coupled to the side outer panel 50 by various methods and, in this embodiment, the second end 160 of the outer sunroof frame 100 makes close contact with the upper surface of the flange 52 of the side outer panel 50 through the sealer 164 which is interposed therebetween. That is, a gap between the outer sunroof frame 100 and the side outer panel 50 is only a path through which rainwater can be drawn into the passenger compartment but, in this embodiment, the gap is sealed watertight by the sealer 164. Thus, rainwater can be reliably prevented from being drawn into the passenger compartment.

The roof rack 300 is mounted to the second end 160 of the outer sunroof frame 100. For this, the mounting member 500 is provided on the second end 160 of the outer sunroof frame 100. The mounting member 500 can be realized by various embodiments and, preferably, the stud bolt 500 is used as the mounting member 500. Furthermore, the roof rack 300 can have various structures and, as in the embodiment of the drawings, it may have a structure such that a coupling bracket 320 is provided in the lower surface of the roof rack 300. The insert space 322 into which the mounting member 500 is inserted is formed in the coupling bracket 320. A nut 340 is tightened over the stud bolt 500 in the insert space 322.

Furthermore, a roof side molding 700 which is in contact with an edge of the rear sunroof glass 14 may be provided between the second end 160 of the outer sunroof frame 100 and the roof rack 300. In this case, a hole, through which the stud bolt 500 passes, is formed through the roof side molding 700.

With respect to the overall structure of various embodiments, the outer sunroof frame 100 which covers the sunroof actuating unit 620 is directly coupled to the side outer panel 50 through the sealer 164. The stud bolt 500 functioning as the mounting member 500 is provided on the outer sunroof frame 100. The stud bolt 500 passes through the roof side molding 700 and is inserted into the insert space 322 formed in the lower surface of the roof rack 300. The nut 340 functions as the fastening member 340 is tightened over the stud bolt 500. As such, in the present invention, the outer sunroof frame 100, the side outer panel 50 and the roof rack 300 are directly coupled together at one junction. Hence, the process of mounting the roof rack to the sunroof is simplified, compared to the conventional technique using a subsidiary frame. Furthermore, the cost of manufacturing the apparatus is reduced by virtue of having no subsidiary frame. In addition, rainwater can be reliably prevented from being drawn into the passenger compartment by sealing the one junction between the components only using the sealer 164 without welding.

Figure 5:
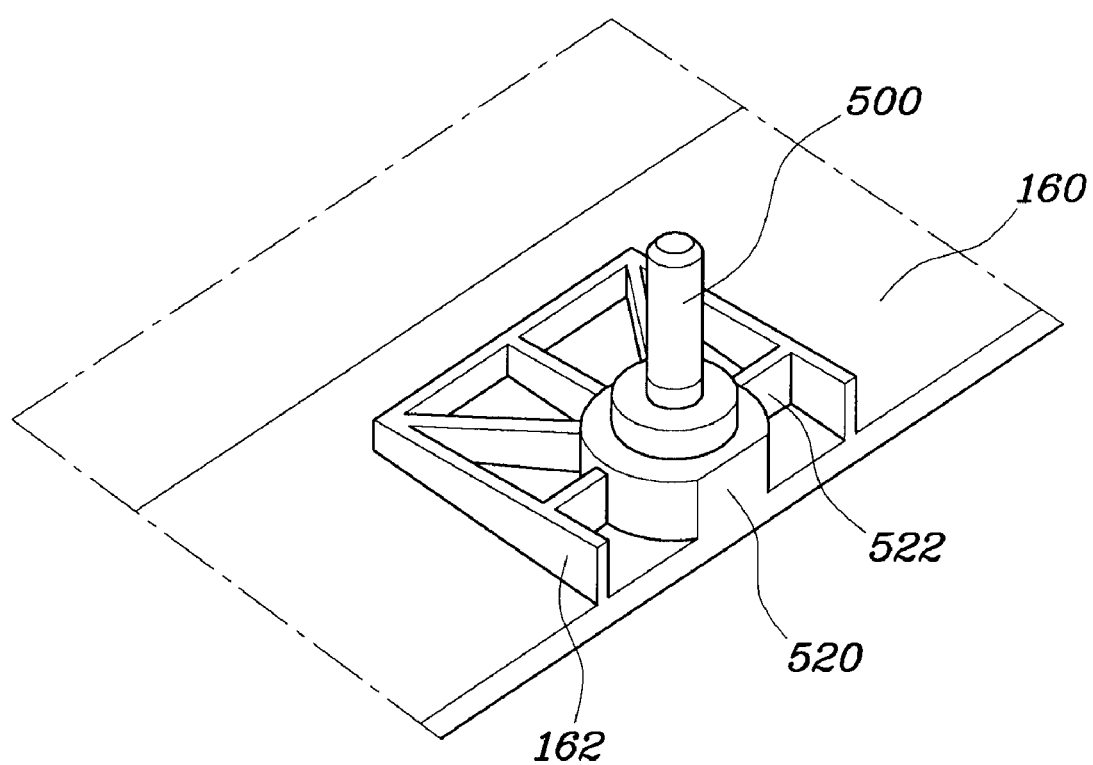
FIG. 5 is a perspective view showing an outer sunroof frame of the roof rack mounting apparatus of FIG. 3.

FIG. 5 is a perspective view showing the stud bolt 500. The stud bolt 500 which is inserted into the roof rack is provided on the second end 160 of the outer sunroof frame 100. In detail, the stud bolt 500 is provided on a support protrusion 520 which is formed on the outer sunroof frame 100. Furthermore, several support ribs 522 which extend predetermined lengths to come in contact with the support protrusion 520 are provided on the outer sunroof frame 100 to support the support protrusion 520. In addition, a support plate 162 is provided on the outer ends of the support ribs 522 such that the support ribs 522 can stably support the support protrusion 520. Thanks to the above-mentioned construction of the support plate 162, the support ribs 522 and the support protrusion 520, the stud bolt 500 can stably and reliably support the roof rack.

As described above, in an apparatus for mounting a roof rack to a sunroof for vehicles according to the present invention, an outer sunroof frame, a side outer panel and a roof rack are directly coupled to each other. Hence, the number of components is reduced, thus reducing work effort and the production cost.

Furthermore, the apparatus of the present invention does not require a component which has required welding operation in the conventional technique, and only a sealer is used in the junction between the components. Therefore, rainwater can be reliably prevented from being drawn into a passenger compartment.

For convenience in explanation and accurate definition in the appended claims, the terms "downwards", "lower" and "upper" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof.

It is intended that the scope of the invention be defined by the Claims appended hereto and their equivalents.

What is claimed is:

1. An apparatus for mounting a roof rack to a sunroof for a vehicle, comprising:
   an outer sunroof frame covering at a first end thereof a sunroof actuating unit and being coupled at a second end thereof to a side outer panel; and
   a mounting member formed at the second end of the outer sunroof frame and coupled to the roof rack.

2. The apparatus as set forth in claim 1, wherein the outer sunroof frame and the side outer panel are coupled to the roof rack under the roof rack in a vertical direction thereof.

3. The apparatus as set forth in claim 1, wherein the mounting member is configured to protrude upwards from the second end of the outer sunroof frame and the roof rack has in a lower surface thereof an insert space, into which a portion of the mounting member is inserted, with a fastening member provided in the insert space and being coupled to the mounting member.

4. The apparatus as set forth in claim 3, wherein the mounting member of the outer sunroof frame comprises a stud bolt, and the fastening member of the roof rack comprises a nut tightened over the stud bolt in the insert space of the roof rack.

5. The apparatus as set forth in claim 4, wherein a support protrusion is provided on the second end of the outer sunroof frame, the support protrusion supporting the stud bolt thereon, and a plurality of support ribs is provided on the second end of the outer sunroof frame, the support ribs extending predetermined lengths to come in contact with the support protrusion to support the support protrusion.

6. The apparatus as set forth in claim 1, wherein a sealer is provided between the second end of the outer sunroof frame and the side outer panel to prevent rainwater from being drawn into a passenger compartment of the vehicle.

7. The apparatus as set forth in claim 6, wherein the sealer is disposed under the roof rack in a vertical direction thereof.

8. The apparatus as set forth in claim 7, wherein a medial portion of the outer sunroof frame is bent downwards to have a concave shape, and a sunroof rail is installed therein, the medial portion of the outer sunroof frame being disposed lower than the sealer.

9. The apparatus as set forth in claim 1, wherein a roof side molding is provided between the second end of the outer sunroof frame and the roof rack in an upward direction, the roof side molding being in contact with an edge of a sunroof glass in a horizontal direction and the roof side molding being coupled to the roof rack by the mounting member.

10. The apparatus as set forth in claim 9, wherein a medial portion of the outer sunroof frame is bent downwards to have a concave shape, and a sunroof rail is installed therein.

11. The apparatus as set forth in claim 10, wherein the edge of the sunroof glass is disposed over the medial portion of the outer sunroof frame.

12. The apparatus as set forth in claim 1, wherein a medial portion of the outer sunroof frame is bent downwards to have a concave shape, and a sunroof rail is installed therein.

13. The apparatus as set forth in claim 1, wherein a flange is provided on an end of the side outer panel adjacent to the sunroof, and the second end of the outer sunroof frame makes close contact with an upper surface of the flange through a sealer which is interposed therebetween.

14. The apparatus as set forth in claim 13, wherein the sealer is disposed under the roof rack in a vertical direction thereof.

15. The apparatus as set forth in claim 14, wherein a medial portion of the outer sunroof frame is bent downwards to have a concave shape, and a sunroof rail is installed therein, the medial portion of the outer sunroof frame being disposed lower than the sealer.

* * * * *